United States Patent
Shah et al.

[11] Patent Number: 5,862,126
[45] Date of Patent: Jan. 19, 1999

[54] CONNECTION ADMISSION CONTROL FOR ATM NETWORKS

[75] Inventors: Syed I. A. Shah, Ottawa; Kun Qian; Todd D. Morris, both of Kanata, all of Canada

[73] Assignee: Northern Telecom Limited, Montreal, Canada

[21] Appl. No.: 709,455

[22] Filed: Sep. 5, 1996

[51] Int. Cl.[6] ............................. H04L 12/28; H04L 12/56
[52] U.S. Cl. ......................... 370/230; 370/233; 370/395
[58] Field of Search ................................. 370/229–234, 370/389, 391, 392, 395, 464, 465, 477, 468; 340/82.5, 82.51, 825.01, 825.03, 826

[56] References Cited

U.S. PATENT DOCUMENTS

| | | | |
|---|---|---|---|
| 4,984,264 | 1/1991 | Katsube | 370/230 |
| 5,267,232 | 11/1993 | Katsube et al. | 370/230 |
| 5,357,507 | 10/1994 | Hughes et al. | 370/234 |
| 5,515,353 | 5/1996 | Ben-Nun et al. | 370/232 |
| 5,519,689 | 5/1996 | Kim | 370/232 |
| 5,530,695 | 6/1996 | Dighe et al. | 370/232 |
| 5,548,581 | 8/1996 | Markrucki | 370/232 |
| 5,583,857 | 12/1996 | Soumiya et al. | 370/233 |
| 5,691,975 | 11/1997 | Hamada et al. | 370/232 |
| 5,724,513 | 3/1998 | Ben-Nun et al. | 395/200.13 |
| 5,793,747 | 8/1998 | Kline | 370/230 |

OTHER PUBLICATIONS

"Effective Bandwidths for the Multi–type UAS Channel", R.J. Gibbens et al, Queueing Systems 9 (1991), pp. 17–28.

"Equivalent Capacity and Its Application to Bandwidth Allocation in High–Speed Networks", R. Guerin et al, IEEE Journal on Selected Areas in Communications, vol. 9, No. 7, Sep. 1991, pp. 968–981.

*Primary Examiner*—Douglas W. Olms
*Assistant Examiner*—Seema S. Rao
*Attorney, Agent, or Firm*—Yoshiharu Toyooka

[57] ABSTRACT

In an ATM network, the physical resources are shared by many connection and the bandwidth is allocated virtually to each connection. The connection admission control (CAC) algorithm uses traffic descriptors, desired quality of service (QOS) parameters etc., to compute a required bandwidth for a requested connection by which it makes a decision to admit or reject the connection. Unlike any prior CAC, the CAC of the invention for constant bit rate (CBR) service takes also into consideration the cells delay variation (CDV) for calculating the required bandwidth.

6 Claims, 2 Drawing Sheets

CONNECTION ADMISSION CONTROL FOR ATM NETWORKS

FIELD OF THE INVENTION

The present invention relates generally to new connection admission control (CAC) techniques for ATM networks. In particular, it is directed to CAC techniques for constant bit rate (CBR) services in which quality of service (QOS) parameters such as cell delay variation (CDV) are taken into consideration.

BACKGROUND OF THE INVENTION

ATM based broadband networks will support diverse applications ranging from voice and circuit emulation to variable bit rate video and data, each having diverse traffic characteristics. This diversity of traffic poses new challenges in terms of bandwidth allocation and traffic control within the network.

The resource (bandwidth) allocation problems in ATM networks are very different from the ones present in circuit switched or the existing packet switched networks. In existing telephone networks, for example, new connection requests are blocked on the basis of a shortage of trunks. In an ATM node this is not the case, since the physical resources are allocated virtually, and shared by many connections. In other words, all connections are statistically multiplexed onto the same link and yet expect the network to meet certain performance requirements for each connection. The problem of allocating appropriate bandwidth to each connection then becomes a crucial one. Routes are typically selected and connections accepted so as to "optimise" some measure of resources utilisation while providing adequate QOS to the carried traffic. This requires knowledge of both the current traffic conditions and the impact of adding a new connection.

The resource allocation procedure hence forth referred to as the connection admission control (CAC) algorithm, uses the connection traffic descriptors (e.g., peak rate, mean rate also referred to as average rate or sustainable bit rate, and maximum burst size) along with the desired QOS parameters (e.g., cell loss, cell delay and cell delay variation) to access the amount of bandwidth required by the connection. The decision to accept or reject a connection is then based on the amount of available bandwidth on the outgoing link, in addition to other parameters which the network administrator may deem necessary to consider.

It should also be noted that although the connection admission control algorithm deals with the cell level performance of a connection, it impacts the call level performance as well via network dimensioning and routing. Both network dimensioning and routing need estimates of required bandwidth for typical connections to determine facility requirements and select appropriate routes respectively.

Generally speaking, in an ATM network a traffic contract is negotiated between the user and the network at each connection setup. The user supplies the traffic characteristics (descriptors), the desired QOS, and the destination address to the network controller. The ATM network controller would pass connection request on to the CAC algorithm. The CAC algorithm then determines whether there is enough free bandwidth available on each hop of the source-destination route to accept the connection.

A connection can belong to one of the four service categories defined by such industry-wide association bodies as ATM FORUM. These service categories are: (1) constant bit rate (CBR) service; (2) variable bit rate (VBR) service; (3) available bit rate (ABR) service; and (4) unspecified bit rate (UBR) service. ATM FORUM defines these services as follows:

The CBR service is for applications and services which have very stringent cell loss, delay and delay variation requirements.

The VBR service is for applications and services which have less stringent cell loss, delay and delay variation requirements than the applications which use the CBR service.

The ABR service is currently being defined by ATM FORUM. This service is meant primarily for data applications such as LAN-to-LAN interconnections.

The UBR service is primarily for data applications. This service has no guaranteed quality of service associated with it. However, the QOS for the UBR service is engineered to meet certain (target) objectives.

The exact problem of bandwidth allocation can be modelled as $\Sigma$ G/D/1/K queuing model. However, the solution to the exact problem is too complicated to meet the real time requirements of a bandwidth allocation algorithm. Therefore suitable approximations must be made. One approximation model is the On/Off fluid flow process.

In "Effective bandwidths for the multi-type UAS channel" by R. J. Gibbens and P. J. Hunt in Queuing Systems (1991) pages 17–28, the uniform arrival and service (UAS) model is used to study traffic offered to a multi-service communication channel. As shown in FIG. 1, a plurality of sources i=(1, ..., N) 10 are multiplexed at a multiplexer 12 to an outgoing link 14. The traffic from each source is assumed to be of the On/Off pattern in which the source generates cells at a constant rate $\gamma$ for a period of time $t_1$ and is silent for a period of time $t_2$. The multiplexer 12 has a buffer 16. The rate $\gamma$ is constant, but both $t_1$ and $t_2$ are random variables. The On and Off periods are usually assumed to be exponentially distributed. According to Gibbens and Hunt, the effective bandwidth of i-th CBR connection can be approximated as follows:

$$\alpha_i(\zeta) = \frac{\zeta\gamma_i + \mu_i + \lambda_i - \sqrt{(\zeta\gamma_i + \mu_i - \lambda_i)^2 + 4\lambda_i\mu_i}}{2\zeta} \quad (1)$$

where $T_{1i}$ and $T_{2i}$ are the mean values of the On and Off periods respectively of i-th connection, i.e. $T_{1i}=<t_{1i}>$ and $T_{2i}=<t_{2i}>$. $\mu_i=1/<t_{1i}>$ and $\lambda_i=1/<t_{2i}>$. $\zeta=\ln(\delta)/L<0$. $\delta$ is the cell loss probability and L is the buffer size (expressed in terms of the number of cells it can hold).

In equation (1)

(a) $\zeta=\ln(\delta)/L=0$ (small d and infinite buffer size, i.e. L->$\infty$) produces the mean bandwidth $r_i$ for connection "i" which is given as $$r_i = \gamma_i \frac{T_{1i}}{T_{1i} + T_{2i}} = \gamma_i \frac{\lambda_i}{\mu_i + \lambda_i}$$

(b) $\zeta=\ln(\delta)/L=-\infty$ (no buffer) produces the peak bandwidth $\gamma_1$ for connection "i".

CACs according to known schemes use aggregates of either peak bandwidth or effective bandwidth, such as $\Sigma\gamma_i$, or $\Sigma r_i$, as the criterion for accepting or rejecting the requested call.

An article entitled "Equivalent Capacity and Its Application to Bandwidth Allocation ;in High-Speed Networks" by R. Guerin, H. Ahmadi and M Naghshineh in IEEE Journal on Selected Areas in Communications Vol. 9, No. 7, September 1991, pages 968–981, describes also in detail the CACs based on the fluid flow model and the stationary bit rate approach using Gaussian approximation. The article mentions that:

> Because all connections are statistically multiplexed at the physical layer and the bit rate of connections varies, a challenging problem is to characterise, as a function of the desired grade of service, the effective bandwidth requirement of both individual connections and the aggregate bandwidth usage of connections multiplexed on a given link. This information is provided by accounting (on each link) for the amount of bandwidth currently allocated to accommodate existing connections, and by identifying how much additional bandwidth needs to be reserved on links over which a new connection is to be routed. Because of the statistical multiplexing of connections and shared buffering points in the network, both the accounting and reservation are based on some aggregate statistical measures matching the overall traffic demand rather than on physically dedicated bandwidth or buffer space per connection. In addition to the inherent complexity of such a matching, another major challenge is to provide these traffic control functions in real-time, upon the arrival of a connection request. The corresponding procedures must, therefore, be computationally simple enough so their overall complexity is consistent with real-time requirements.

The article then reports that:

> we propose a computationally simple approximation for the equivalent capacity or bandwidth requirement of a single or multiplexed connections on the basis of their statistical characteristics. When connections are statistically multiplexed, their aggregate statistical behaviour differs from their individual statistical representation. One needs, therefore, to define new metrics to represent the effective bandwidth requirement of an individual connection as well as the total effective bandwidth requirement of connections multiplexed on each link. The purpose of the equivalent capacity expression is to provide a unified metric to represent the effective bandwidth of a connection as well as the effective aggregated load on network links at any given time. These link metrics can then be used for efficient bandwidth management, routing, and call control procedures.

Guerin et al considered two approximations, fluid flow approximation and stationary approximation. The fluid flow approximation is substantially same as the one discussed by Gibbens and Hunt referenced above. This approximation produces the effective bandwidth for connection (i) as $c_i$.

The stationary approximation results in an equation of $$C(s) = m + \alpha'\sigma \text{ with } \alpha' = \sqrt{-2\ln(\epsilon) - \ln(2\pi)}$$

where m is the mean aggregate bit rate and $\sigma$ is the standard deviation of the aggregate bit rate and $\epsilon$ is the buffer overflow probability.

Finally the article states that the equivalent capacity, C is taken to be the minimum of $$C = \min\left(m + \alpha'\sigma, \sum_{i=1}^{N} c_i\right)$$

where N is the number of multiplexed connections.

Guerin et al uses this equivalent bandwidth as the criterion for accepting or rejecting the requested call.

As discussed above, constant bit rate connections are ideally characterised by periodic cell arrivals at the switch or multiplexer. However, in reality due to buffering in the customer premises equipment (CPE) and the upstream switches the traffic characteristics of the CBR connections change from a well behaved periodic (100% correlated) cell stream to a stochastic (or less correlated) cell stream with cell inter-arrival times distributed according to the delay experienced by the cell in the queues. This variation in the inter-arrival time causes the peak rate of the connection to momentarily increase or decrease around the application's peak rate, resulting in an increase in the buffer and bandwidth requirements. This increase in the buffer and bandwidth requirements is dependent on the absolute value and distribution of cell delay variation (CDV).

Therefore, the amount of bandwidth allocated to CBR connections is a function of: (1) peak rate of the connection; (2) the CDV value and distribution; (3) the available buffering; and (4) the QOS requirements of the connections. Hence an admission control scheme discussed above will not work in many cases where CDV and available buffering must be taken into consideration.

The known approximation schemes such as those discussed above have not addressed these effects and the invention improves the calculation of required bandwidth by taking into account of CDV cell delay variation and available buffering.

OBJECTS OF THE INVENTION

It is an object of the invention to provide a CAC process for CBR services in an ATM network which is accurate and better reflect the practical situation.

It is another object of the invention to provide a CAC process for CBR services in an ATM network which takes into consideration the effect of CDV.

SUMMARY OF THE INVENTION

Briefly stated, the invention in one aspect is directed to a connection admission control process for CBR connections in an ATM switching network. The process comprises steps of receiving a CBR connection request specifying a maximum allowed CDVT as a QOS parameter, where CDVT is a cell delay variation in seconds, receiving a CBR connection request specifying connection traffic descriptors, and receiving network state parameters. The process further includes steps of calculating required bandwidth C for accepting the requested connection according to a predetermined equation using the maximum allowed CDVT, connection traffic descriptors and network state parameters, and determining to accept the connection request if C<A where A is an available network bandwidth.

DETAILED DESCRIPTION OF THE PREFERRED EMBODIMENTS OF THE INVENTION

Figure 1:
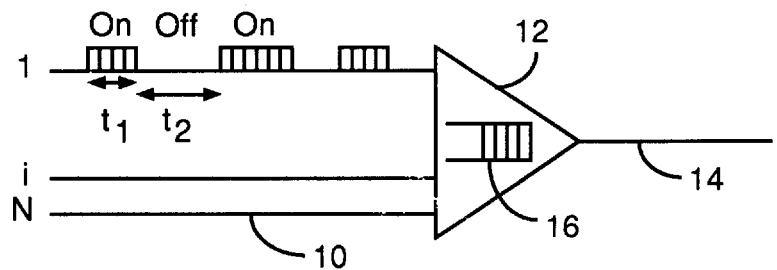
FIG. 1 is a model used for fluid flow approximation scheme.
Figure 2A:
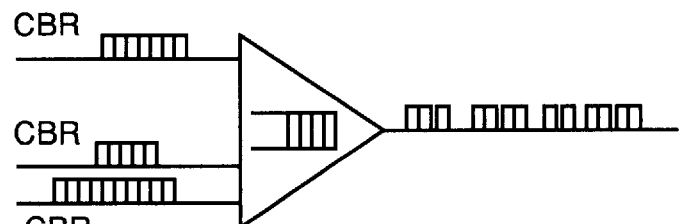
FIGS. 2a and 2b illustrate categories of impact by CDV on the outgoing link.
Figure 2B:
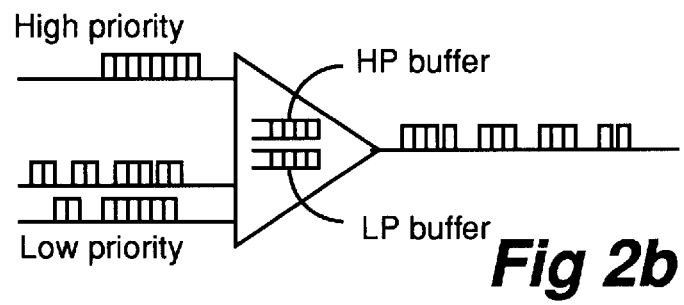

CDV is a manifestation of the jitters experienced at the physical layer and the effect of traffic from other connections sharing the same queue and the same outgoing link in the absence of a scheduler. As shown in FIGS. 2a and 2b, the traffic related impacts on the CDV can be divided into two categories: (1) cross traffic impacts; and (2) priority impact. In FIG. 2a all the sources are generating CBR traffic of equal priority which are multiplexed to an outgoing link. Cross traffic impact could be defined as the variation in the queue length due to the statistical variation of traffic from other connections sharing the same queue. In FIG. 2b, on the other hand, sources are generating traffic of different priority which requires a separate queue for each priority. Priority impact is due to preemption of service by higher priority cells sharing the same outgoing link. In the present invention, all CBR connections have an equal priority. In the case where different classes of traffic is involved, the impact of priority on CBR connections would be minor since all CBR connections would be treated equally and given priority over other connections due to time sensitive nature of the CBR service.

As in the prior art, for calculating the bandwidth allocation, the On/Off fluid flow model is also used for approximation. The rationale for using this approximation is that with the introduction of CDV, the CBR cell stream can be approximated as a geometrically distributed On/Off source. This approximation is also simple and the use of a geometrically distributed CDV would result in the worst case CDV analysis.

As mentioned earlier, for CBR services, the cross traffic impact of CDV is more important and is considered here. Two methodologies are used: (1) when the CDV is less or equal to the inter-cell arrival time; and (2) when the CDV is greater than the inter-cell arrival time. The first is to model the CDV as the inter-departure time of an M/D/1 queue and its variation (modelled the CDV as the output process of an M/D/1 queue) and the second is by assuming the CDV to be the geometrically distributed delay variation.

These processes are then mapped into the geometrically distributed On/Off source model in which the equation of Gibbens and Hunt can be used.

M/D/1 Model

Assuming that a large number of sources are multiplexed at the CPE, each having different arrival process ranging from periodic to On/Of bursty, it is possible to approximate the input process as a Poisson process. Hence the multiplexer can be modelled as an M/D/1 queue. In the general case for a $\Sigma G/G/1$ queue the mean departure process is given as:

$$\text{Mean inter-departure time} = E[T_D] = \frac{1}{\lambda_i}$$

where $\lambda_i$ is the arrival rate of connection "i". The coefficient of variation of the inter-departure time $(C_{D,i}^2)$ is given as:

$$C_{D,i}^2 = (1-r^2)C_{A,i}^2 + r^2 C_{D1,i}^2$$

where $C_{A,i}^2$ and $C_{D1,i}^2$ are the coefficient of variation of the arrival process of connection "i" and the coefficient of variation of the holding time respectively. r is the total utilisation of the link. For a single connection system the coefficient of variation of inter-departure time is given as;

$$C_i^2 = q_i C^2 + (1-q_i)$$

$$C^2 = (1-r^2)C_{A,i}^2 + r^2 C_{D1,i}^2$$

where $q_i$ is the probability that the packet belongs to connection "i". For an M/D/1 queue, $C_{A,i}^2 = 1$. Therefore;

$$C^2 = 1 - r^2$$

$$C_i^2 = q_i C^2 + 1 - q_i$$

Figure 3:
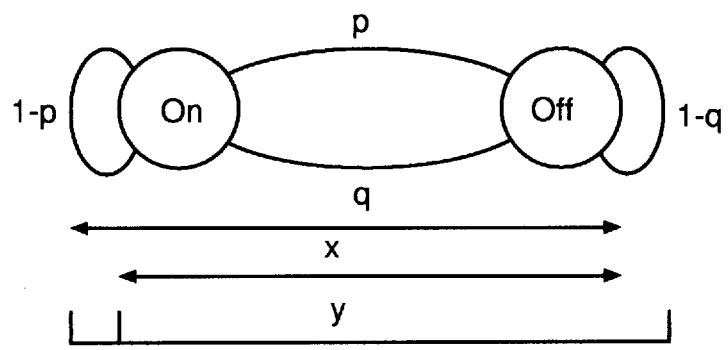
FIG. 3 is a state diagram for geometrically distributed On/Off process.

This output process has to be mapped into the geometrically ON/OFF process. The geometrically ON/OFF process is shown in FIG. 3. Let x be a random variable which represents a cell arrival and y be the random variable which represents the inter-arrival time between the cells, then;

$$x = \begin{cases} \dfrac{1}{\gamma} & \text{with probability } (1-p) \\ \dfrac{1+y}{\gamma} & \text{with probability } p \end{cases}$$

where $\gamma$ is the link rate. Therefore;

$$E[x] = E\frac{1-p}{\gamma} + E\left[\frac{1+y}{\gamma}\right]p = \frac{1}{\gamma}\left[1 + \frac{p}{q}\right] = \frac{1}{\text{mean rate}}$$

where mean rate of CBR connections is the peak rate. The second moment of the process is given as:

$$E[x^2] = E\left[\frac{1-p}{\gamma^2} + \frac{(1+y)^2}{\gamma^2}p\right] = \left(1 + \frac{2p+pq}{q^2}\right)\frac{1}{\gamma^2}$$

But the squared coefficient of variation of the inter-departure time is defined as $$C^2 = \frac{E[x^2]}{(E[x])^2} - 1$$

After some manipulation following results are obtained:

$$\frac{1}{\mu} = \frac{1}{\gamma p}$$

and $$p = \frac{2}{\phi + \phi^2 C}, \text{ where } \phi = 1 + \frac{1}{\frac{\gamma}{\nu} - 1}$$

Geometric Model

In the Geometric modelling case, the number of cells that can be bunched together is calculated and then "p" is approximated as follows:

$$p = 1 - 10^{\left[\frac{-9}{M}\right]}, \text{ where } M = \left\lfloor \frac{T}{T-\delta} \right\rfloor$$

$$\frac{1}{\mu} = \frac{1}{\gamma p}$$

Figure 4:
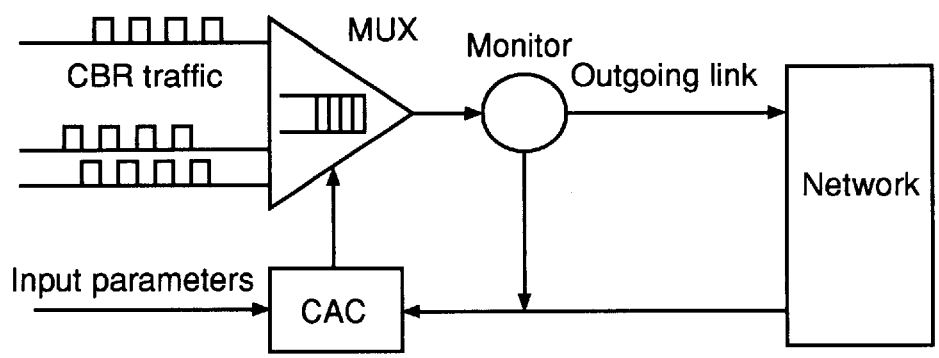
FIG. 4 is a schematic illustration of CAC procedure according to an embodiment of the invention.
Figure 5:
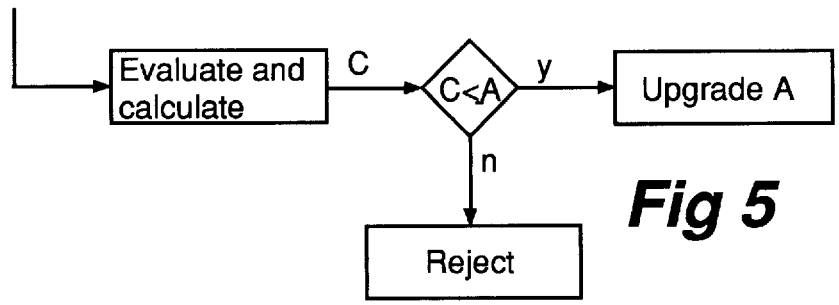
FIG. 5 is a algorithmic flow chart of CAC procedure according to an embodiment of the invention.

FIG. 4 is a schematic illustration of CAC process according to one embodiment of the invention. In the Figure, a plurality of CBR traffic from a plurality of sources are buffered in a queue and then multiplexed to an outgoing link. At each connection request from a source, CAC procedure takes in input parameters some of which are supplied by the source and others are obtained from the network operator through monitoring the state of the outgoing link or the other nodes, such as the degree of congestion etc. The decision of the CAC is sent to the multiplexer to accept or reject the connection request. FIG. 5 is an algorithmic flow chart of the CAC procedure according to one embodiment of the invention. When a new connection request is received, the CAC process takes in the /following inputs for the requested connection; 1) connection traffic parameters (peak rate, cell delay variation tolerance); 2) QOS values (cell loss ratio, cell delay and cell delay variation); 3) buffer size; 4) input link rate; and 5) output link rate. Once the inputs are received, the required bandwidth is calculated using the algorithm described above. The required bandwidth obtained is then compared against the available bandwidth to determine whether the connection can be accepted or not. It should be noted that a network operator would have its own admission criteria and may not use all of these input parameters.

In one embodiment, following input parameters are used for calculation:
(a) Peak cell rate of connection $v$ in cells/sec.
(b) Incoming link rate $\gamma$ in cells/sec.
(c) Cell loss probability $Ploss_{cbr}$ of the CBR service.
(d) Buffer size $B_{cbr}$ for high priority queue in cells.
(e) Maximum allowed CDVT for CBR service in sec.
(f) Tuning factor ($\pi$).
Evaluate
Following values are computed:

$$\rho_3 = \frac{v}{\kappa}$$

$$T = \frac{1}{v}$$

$$\delta = \frac{1}{\gamma}$$

$$M = \left\lfloor \frac{t}{T-\delta} \right\rfloor$$

$$p = 1 - 10\left[\frac{-9}{M}\right]$$

$$\zeta = \frac{\ln\left[\frac{Ploss_{cbr}}{\rho_3}\right]}{B_{cbr}}$$

$$\phi = 1 + \frac{1}{\frac{\gamma}{v} - 1}$$

The bandwidth requirement C is calculated as follows:

$$\mu = \min\left\{\frac{2\gamma}{\phi + \phi^2}, \gamma p\right\}$$

$$\lambda = \frac{v\mu}{\gamma - v}$$

$$C = \pi \left(\frac{\gamma\zeta + \lambda + \mu - \sqrt{(\gamma\zeta - \lambda + \mu)^2 + 4\mu\lambda}}{2\zeta}\right)$$

It is also desirable that enough buffering is allocated to CBR connections so that cell losses due to buffer overflows are smaller than the desired QOS of the connections and the cell transfer delay and CDV requirements are met. The first problem of ensuring that the cell delay and CDV is not more than that specified for CBR connections can be solved by dimensioning the buffers in the following manner (it is assumed that the cross-office CDV is not more than 250 $\mu$sec.)

Since the CDV is a function of the outgoing link rate, the cases corresponding to STS-12c and STS-3c interfaces are considered. In the STS-12c interface the buffer in the access card is negligible and hence its effect is ignored. The buffer allocation in the switch fabric is important. The maximum buffer size is given as:

Buffer size 620×250/53×8=365 cells

In the STS-3c interface, CDV is not separated between the switch fabric and the access card, but rather use statistical partitioning of buffers, i.e., the CDV is not divided in proportion to the outgoing link speed but is probabilistically divided between the switch fabric and the access card. Since the exact distribution and value of CDV is very difficult to determine, bounds on the cross office CDV is determined by taking two extreme cases: I) assuming pure CBR connections; and 2) assuming a geometrically On/Off source. The pure CBR assumption represents the optimistic case and the geometrically On/Off represents the pessimistic case. The actual CDV would lie in-between the two extremes. The result of investigations shows that a buffer size of 100 cells would be adequate to ensure the cross-office CDV of 250 $\mu$sec.

What is claimed is:

1. A connection admission control process for CBR connections in an ATM switching network, comprising steps of:
  receiving a CBR connection request specifying connection traffic descriptors, and a maximum allowed CDVT as a QOS parameter, where CDVT is a cell delay variation in seconds,
  receiving network state parameters,
  calculating a required bandwidth C for accepting the requested connection according to a predetermined equation using the maximum allowed CDVT, connection traffic descriptors and network state parameters, and
  determining to accept the connection request if C<A where A is an available network bandwidth.

2. A connection admission control process for CBR connections in an ATM switching network according to claim 1, comprising a further step of updating the available bandwidth with the calculated required bandwidth C.

3. A connection admission control process for CBR connections in an ATM switching network according to claim 2, comprising a further step of introducing a tuning factor $\pi$ into the calculating step.

4. A connection admission control process for CBR connections in an ATM switching network according to claim 3 wherein:
  the connection traffic descriptors are a peak cell rate and an incoming link rate, and
  another QOS parameter is a cell loss probability.

5. A connection admission control process for CBR connections in an ATM switching network according to claim 4 wherein:
  the network state parameters are a buffer size and a congestion indicator.

6. A connection admission control process for CBR connections in an ATM switching network according to claim 5 wherein: v: the peak cell rate of connection in cells/sec, γ: incoming link rate in cells/sec, $Ploss_{cbr}$: cell loss probability, $B_{cbr}$: buffer size in cells, CDVT: maximum allowed CDV in sec and (π): tuning factor, further comprising steps of:

evaluating following values $$\rho_3 = \frac{v}{\kappa}$$

$$T = \frac{1}{v}$$

$$\delta = \frac{1}{\gamma}$$

$$M = \left\lfloor 1 \frac{t}{T-\delta} \right\rfloor$$

$$p = 1 - 10^{\left[\frac{-9}{M}\right]}$$

$$\zeta = \frac{\ln\left[\frac{Ploss_{cbr}}{\rho_3}\right]}{B_{cbr}}$$

$$\phi = 1 + \frac{1}{\frac{\gamma}{v} - 1}$$

and calculating the bandwidth requirement C as follows:

$$\mu = \min\left\{\frac{2\gamma}{\phi + \phi^2}, \gamma p\right\}$$

$$\lambda = \frac{v\mu}{\gamma - v}$$

$$C = \pi \left(\frac{\gamma\zeta + \lambda + \mu - \sqrt{(\gamma\zeta - \lambda + \mu)^2 + 4\mu\lambda}}{2\zeta}\right).$$

* * * * *